(12) United States Patent
Nagesh et al.

(10) Patent No.: US 8,694,404 B2
(45) Date of Patent: Apr. 8, 2014

(54) SYSTEM AND METHOD FOR OPTIMIZING FIXED RATE WHOLE LOAN TRADING

(75) Inventors: Harsha Nagesh, Highland Park, NJ (US); Rajan Godse, Plainsboro, NJ (US)

(73) Assignee: Credit Suisse Securities (USA) LLC, New York, NY (US)

( * ) Notice: Subject to any disclaimer, the term of this patent is extended or adjusted under 35 U.S.C. 154(b) by 778 days.

(21) Appl. No.: 12/533,315

(22) Filed: Jul. 31, 2009

(65) Prior Publication Data

US 2010/0057635 A1 Mar. 4, 2010

Related U.S. Application Data

(60) Provisional application No. 61/191,011, filed on Sep. 3, 2008.

(51) Int. Cl.
 *G06Q 40/00* (2012.01)
(52) U.S. Cl.
 USPC ...................................................... 705/36 R
(58) Field of Classification Search
 USPC ...................................................... 705/36 R
 See application file for complete search history.

(56) References Cited

FOREIGN PATENT DOCUMENTS

DE EP 1 376 421 * 6/2002 .............. G06F 17/60

OTHER PUBLICATIONS

Yago et al.: The U.S. Leveraged Loan Market: A Primer, Oct. 2004, Milken Institute, pp. 1-78.*
Giddy, I: Mortgage-Backed Securities, 1999, Stern School of Business, New York University, pp. 1-20.*
Jiangli et al.: Banking and Securitization, Aug. 16, 2007, pp. 1-76.*
Ugur et al.: Securitization: A Basic Tool for Financing for the Terms, 2007, Elektronic Sosyal Bilimler Dergisi, C.6 S.22, pp. 220-246.*

* cited by examiner

*Primary Examiner* — Bijendra K Shrestha
(74) *Attorney, Agent, or Firm* — King & Spalding

(57) ABSTRACT

Optimizing fixed rate whole loan trading. Specifically, the invention provides computer-based systems and methods for optimally packaging a population of whole loans into bonds in either a senior/subordinate bond structure or into pools of pass through securities guaranteed by a government agency. Models for each type of bond structure are processed on the population of loans until either an optimal bond package is found or a user determines that a solution of sufficient high quality is found. Additionally, the models can account for bids for whole loans by allocating whole loans that meet requirements of the bid but are least favorable to be securitized.

20 Claims, 8 Drawing Sheets

SYSTEM AND METHOD FOR OPTIMIZING FIXED RATE WHOLE LOAN TRADING

RELATED APPLICATION

This non-provisional patent application claims priority under 35 U.S.C. §119 to U.S. Provisional Patent Application No. 61/191,011, filed Sep. 3, 2008, entitled, "System and Method for Optimizing Fixed Rate Whole Loan Trading," which is hereby fully incorporated herein by reference.

TECHNICAL FIELD

The present invention relates generally to systems and methods for optimizing loan trading and more specifically to computerized systems and computer implemented methods for optimizing packages of whole loans for execution into bonds or sale as whole loan packages.

BACKGROUND

Financial institutions, such as investment banks, buy loans and loan portfolios from banks or loan originators primarily to securitize the loans into bonds and then sell the bonds to investors. These bonds are considered asset-backed securities as they are collateralized by the assets of the loans. Many types of loans can be securitized into bonds, including residential mortgages, commercial mortgages, automobile loans, and credit card receivables.

A variety of bond structures can be created from a population of loans, each structure having characteristics and constraints that need to be accounted for in order to maximize the profit that a financial institution can realize by securitizing the loans into bonds. The optimal grouping or pooling of loans into bonds for a given bond structure and a given loan population can depend on the characteristics of each loan in the population. Furthermore, the bond pool or execution coupon that an individual loan executes into can depend on the bond pool or best execution of each other loan in the population. As the typical loan population considered for securitizing into bonds is very large (e.g. 10,000 loans or more), determining an optimal pooling of loans for securitizing into bonds can be challenging.

Accordingly, what is needed are systems and methods for optimizing the packaging of a population of loans into bonds for a given bond structure.

SUMMARY

The invention provides computerized systems and computer implemented methods for optimizing fixed rate whole loan trading for a population of whole loans.

An aspect of the present invention provides a system for optimizing fixed rate whole loan trading. This system includes a computing system that includes a software application including one or more modules operable to develop a model for determining a securitization strategy for a population of whole loans, the securitization strategy including bonds; and operable to process the model until an optimal securitization strategy for the population of whole loans is found; and a user interface for receiving user input for the one or more modules and for outputting the optimal securitization strategy, the user interface being in communication with the software application.

Another aspect of the present invention provides a computer-program product including a computer-readable medium having computer-readable program code embodied therein for determining an optimal execution bond coupon for each loan in a group of loans in a senior/subordinate bond structure. This computer-readable medium includes computer-readable program code for creating a model comprising an objective function representing a total market value of the senior/subordinate bond structure for the loans; and computer-readable program code for maximizing the objective function to maximize the total market value of the senior/subordinate bond structure.

Another aspect of the invention provides a computer program product including a computer-readable medium having computer-readable program code embodied therein for optimally pooling loans into pass through bond pools. This computer-readable medium includes computer-readable program code for creating a model corresponding to pass through bond pools, each pass through bond pool including a constraint; computer-readable program code for applying the constraint of each pass through bond pool to each of the loans to determine which pass through bond pools each of the loans is eligible; and computer-readable program code for processing the model to determine the optimal pooling.

Another aspect of the invention provides a computer program product including a computer-readable medium having computer-readable program code embodied therein for allocating a portion of a group of loans to a loan package. This computer-readable medium includes computer-readable program code for determining which of the loans meet one or more constraints of the loan package; computer-readable program code for determining a market price of each of the loans based on a securitization model; computer-readable program code for modeling an objective function to determine which loans in the group of loans that meets the one or more constraints are least profitable for securitization in the securitization model; and computer-readable program code for allocating the loans that meets the one or more constraints and are least profitable for securitization into the loan package.

Another aspect of the present invention provides a method for optimizing fixed rate whole loan trading. This method includes the steps of determining a bond structure to securitize whole loans; developing a model comprising an objective function that represents a total market value for the whole loans when executed into bonds corresponding to the bond structure; processing the model to determine which of a group of available bonds should be generated and into which bonds of the generated bonds that each of the whole loans best executes into.

Another aspect of the present invention provides a computer program product including a computer-readable medium having computer-readable program code embodied therein for optimally pooling excess coupon resulting from securitizing loans. This computer-readable medium includes computer-readable program code for creating a model corresponding to excess coupon bond pools and an unallocated pool, each excess coupon bond pool including at least one constraint; and computer-readable program code for processing the model to allocate each of the loans into either an excess coupon bond pool or into the unallocated pool in order to maximize the total market value of the excess coupon that gets allocated to the excess coupon bond pools.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description, in conjunction with the accompanying figures briefly described as follows.

DETAILED DESCRIPTION OF EXEMPLARY EMBODIMENTS

The invention provides computer-based systems and methods for optimizing fixed rate whole loan trading. Specifically, the invention provides computer-based systems and methods for optimally packaging a population of whole loans into bonds in either a senior/subordinate bond structure or into pools of pass through securities guaranteed by a government agency. Models for each type of bond structure are processed on the population of loans until either an optimal bond package is found or a user determines that a solution of sufficient high quality is found. Additionally, the models can account for bids for whole loans by allocating whole loans that meet requirements of the bid but are least favorable to be securitized. Although the exemplary embodiments of the invention are discussed in terms of whole loans (particularly fixed rate residential mortgages), aspects of the invention can also be applied to trading other types of loans and assets, such as variable rate loans and revolving debts.

The invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow. Further, it will be appreciated to those skilled in the art that one or more of the stages described may be performed by hardware, software, or a combination thereof, as may be embodied in one or more computing systems.

Figure 1:
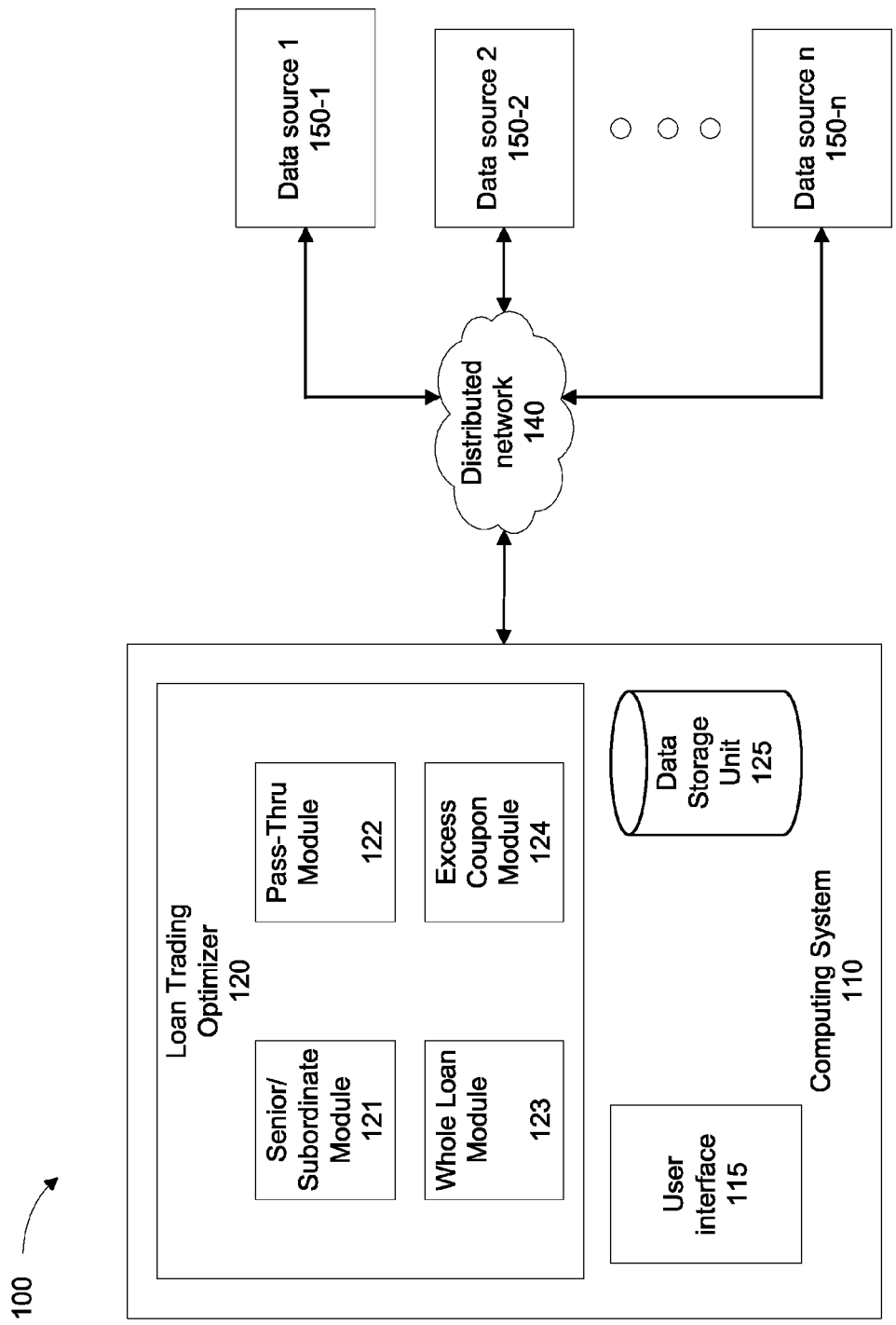
FIG. 1 is a block diagram depicting a system for optimizing fixed rate whole loan trading in accordance with one exemplary embodiment of the present invention.

Turning now to the drawings, in which like numerals represent like elements throughout the figures, aspects of the exemplary embodiments will be described in detail. FIG. 1 is a block diagram depicting a system 100 for optimizing fixed rate whole loan trading in accordance with one exemplary embodiment of the present invention. Referring to FIG. 1, the system 100 includes a computing system 110 connected to a distributed network 140. The computing system 110 may be a personal computer connected to the distributed network 140. The computing system 110 can include one or more applications, such as loan trading optimizer application 120. This exemplary loan trading optimizer 120 includes four modules 121-124 that can operate individually or interact with each other to provide an optimal packaging of loans into one or more bond structures and whole loan packages.

A senior/subordinate module 121 distributes loans into a senior/subordinate bond structure with bonds having different credit ratings and different net coupon values. As will be discussed in more detail with reference to FIGS. 4-5, the senior/subordinate module 121 distributes the loans into bonds having a AAA rating, subordinate bonds with lower credit ratings, and, depending on the loans and the coupon values of the AAA bonds and the subordinate bonds, interest only bonds and principal only bonds.

A pass-thru module 122 distributes loans into pass through bonds guaranteed by a government agency, such as Freddie Mac or Fannie Mae. The pass-thru module 122 optimally pools the loans into To Be Announced (TBA) pass through securities based on a variety of constraints. The pass-thru module 122 is discussed in more detail below with reference to FIG. 6.

A whole loan module 123 allocates loans to meet bids for loan portfolios meeting specific requirements and constraints of the bid. The whole loan module 123 can interact with either the senior/subordinate module 121 or the pass-thru module 122 to allocate loans that meet the requirements of the bids but are less favorable to be securitized. The whole loan module 123 is discussed below in more detail with reference to FIG. 7.

An excess coupon module 124 distributes excess coupons of securitized loans into different bond tranches or pools. The excess coupon module 124 can pool excess coupons resulting from senior/subordinate bond structure created by the senior/subordinate module 121 and/or excess coupons resulting from pass through securities created by the pass-thru module 122. The excess coupon module 124 is discussed below in more detail with reference to FIG. 8.

Users can enter information into a user interface 115 of the computing system 110. This information can include a type of bond structure to optimize, constraints associated with bond structures and bond pools, information associated with loan bids, and any other information required by the loan trading optimizer 120. After the information is received by the user interface 115, the information is stored in a data storage unit 125, which can be a software database or other memory structure. Users can also select a population of loans to consider for optimization by way of the user interface 115. The loans can be stored in a database stored on or coupled to the computing system 110 or at a data source 150 connected to the distributed network 140. The user interface 115 can also output to a user the bond packages and whole loan packages determined by the loan trading optimizer 120.

The loan trading optimizer 120 can communicate with multiple data sources 150 by way of the distributed network 140. For example, the loan trading optimizer 120 can communicate with a data source 150 to determine Fannie Mae TBA prices and another data source 150 to determine U.S. Treasury prices. In another example, the loan trading optimizer 120 can communicate with a data source 150 to access information associated with bids for whole loan packages. The distributed network 140 may be a local area network (LAN), wide area network (WAN), the Internet or other type of network.

Figure 2:
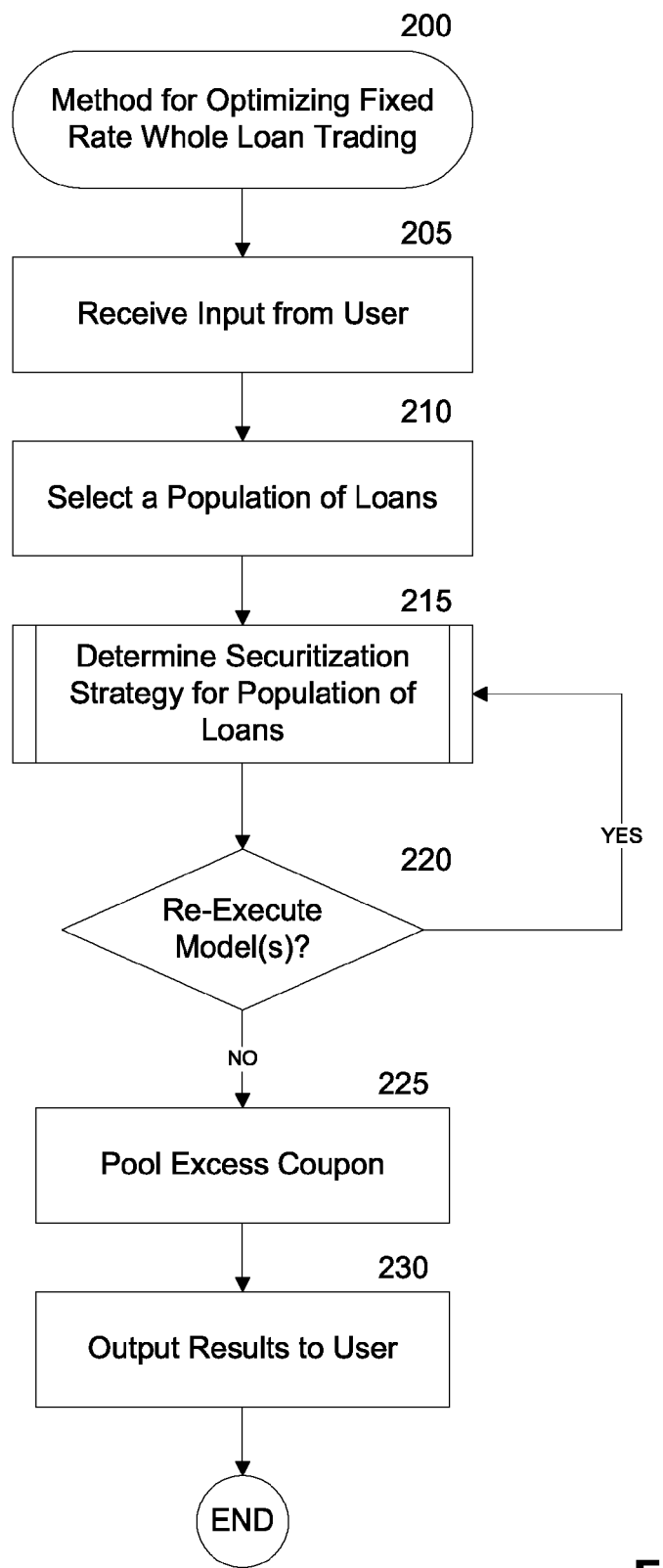
FIG. 2 is a flow chart depicting a method for optimizing fixed rate whole loan trading in accordance with one exemplary embodiment of the present invention.

FIG. 2 is a flow chart depicting a method 200 for optimizing fixed rate whole loan trading in accordance with one exemplary embodiment of the present invention. Referring to FIGS. 1 and 2, at step 205, the user interface 115 receives input from a user. This user input is used by the loan trading optimizer 120 to determine the bond structure that should be optimized for a population of loans. For example, if the user desires to find the optimal pooling of loans for pass through bonds, the user can input the constraints for each bond pool. Examples of constraints for pass through bond pools include constraints on loan balances, total number of loans for a pool, and total loan balance for a pool.

At step 210, a population of loans is selected for optimization. The population of loans can be selected from loans stored in a loan database stored on or coupled to the computing system 110 or from a database at a data source 150 connected to the distributed network 140. The population of loans can include loans currently owned by the user (e.g. investment bank) of the loan trading optimizer 120 and/or loans that are up for bid by another bank, loan originator, or other institution. For example, a user may employ the loan trading optimizer 120 to find the maximum market value of a loan portfolio currently for sale in order to determine an optimal bid for the loan portfolio. Additionally, a user can select the population of loans by specifying certain criteria, such as maximum loan balance, location of the loans, and FICO score.

At step 215, the loan trading optimizer 120 determines a securitization strategy for the population of loans selected in step 210. Depending upon the user inputs received in step 205, the loan trading optimizer 120 employs one or more of the senior/subordinate module 121, the pass-thru module 122, and the whole loan module 123 to determine the securitization strategy for the population of loans. Step 215 is discussed in more detail with reference to FIGS. 3-7.

At step 220, the loan trading optimizer 120 determines whether the securitization strategy returned at step 215 is of sufficiently high quality. In this exemplary embodiment, the loan trading optimizer 120 iterates the step of determining a securitization strategy for the population of loans until either an optimal solution is found or the user determines that the securitization strategy is of sufficiently high quality. In order for the user to determine if the securitization strategy if of sufficient high quality, the loan trading optimizer 120 can output the results to the user by way of the user interface 115. The loan trading optimizer 120 can output these results based on a number of iterations of step 215 (e.g. every 100 iterations) or when a certain level of quality is found. The user interface 115 can then receive input from the user indicating whether the securitization strategy is of sufficient high quality. If the securitization strategy is of sufficient high quality or optimal, the method 200 proceeds to step 225. Otherwise, the method 200 returns to step 215.

In one exemplary embodiment, quality is measured in terms of the total dollar value of the population of loans. For example, the user may desire to sell a population of loans for at least ten million dollars in order to bid on the loans. The user can set a threshold for the loan trading optimizer 120 to only return a solution that meets this threshold or a solution that is the optimal solution if the optimal solution is below this threshold.

At step 225, the excess coupon module 124 of the loan trading optimizer 120 can pool any excess coupon resulting from the securitization strategy determined in step 215. This step is optional and is discussed below in more detail with reference to FIG. 8.

At step 230, the loan trading optimizer 120 communicates the final securitization strategy to the user interface 115 for outputting to a user. The user interface 115 can display the final securitization strategy and optionally other possible securitization strategies with similar quality levels.

Figure 3:
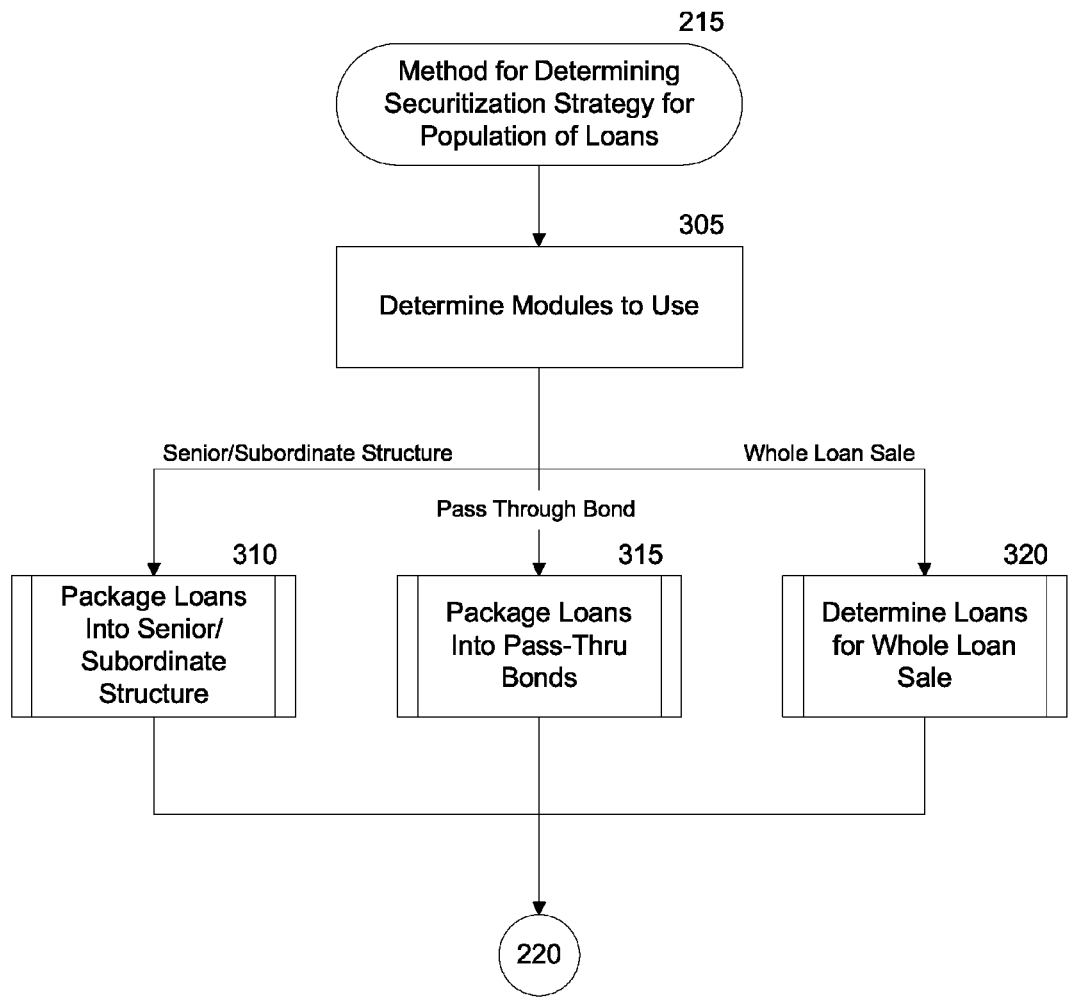
FIG. 3 is a flow chart depicting a method for determining a securitization strategy for a population of loans in accordance with one exemplary embodiment of the present invention.

FIG. 3 is a flow chart depicting a method 215 for determining a securitization strategy for a population of loans in accordance with one exemplary embodiment of the present invention. Referring to FIGS. 1 and 3, at step 305, the loan trading optimizer 120 determines which models to use for determining the securitization strategies. In this exemplary embodiment, the loan trading optimizer 120 includes a senior/subordinate module 121, a pass-thru module 122, and a whole loan module 123. Each of the modules 121-123 can build and process a model for determining an optimal packaging of loans as discussed below. The loan trading optimizer 120 determines which modules 121-123 to use based on the input received from the user in step 205 of FIG. 2. For example, the user may specify that only a senior/subordinate structure should be optimized for the population of loans. Alternatively, if the user has entered bid information for a portfolio of whole loans, the loan trading optimizer 120 can execute the whole loan module 123 with the senior/subordinate module 121 and/or the pass-thru module 122 to determine which of the loans meet the requirements of the bid and are least favorable for securitization. Additionally, a user may specify that both an optimal senior/subordinate bond structure and an optimal pooling of pass through bonds should be determined for the population of loans.

If the user selected that a senior/subordinate bond structure should be optimized, the method 215 proceeds to step 310. At step 310, the senior/subordinate module 121 develops a model for packaging the population of loans into a senior/subordinate bond structure and processes the model to determine an optimal senior/subordinate bond structure for the loan population. Step 310 is discussed in more detail with reference to FIGS. 4 and 5. After the senior/subordinate structure is determined, the method 215 proceeds to step 220 (FIG. 2).

If the user selected that the population of loans should be optimally pooled into pass through bonds, the method 215 proceeds to step 315. At step 315, the pass-thru module 122 develops a model for pooling the population of loans into multiple bond pools and processes the model to determine an optimal pooling for the loan population. Step 315 is discussed in more detail with reference to FIG. 6. After the pooling is determined, the method 215 proceeds to step 220 (FIG. 2).

If the user selected that whole loans should be allocated to a package of whole loans to be sold, the method 215 proceeds to step 320. At step 320, the whole loan module 123 develops a model for allocating whole loans that meet certain constraints and are less favorable to be securitized into a whole loan package and processes the model to determine which loans are best suited for the whole loan package. Step 320 is discussed in more detail with reference to FIG. 7. After the whole loan package is determined, the method 215 proceeds to step 220 (FIG. 2).

Figure 4:
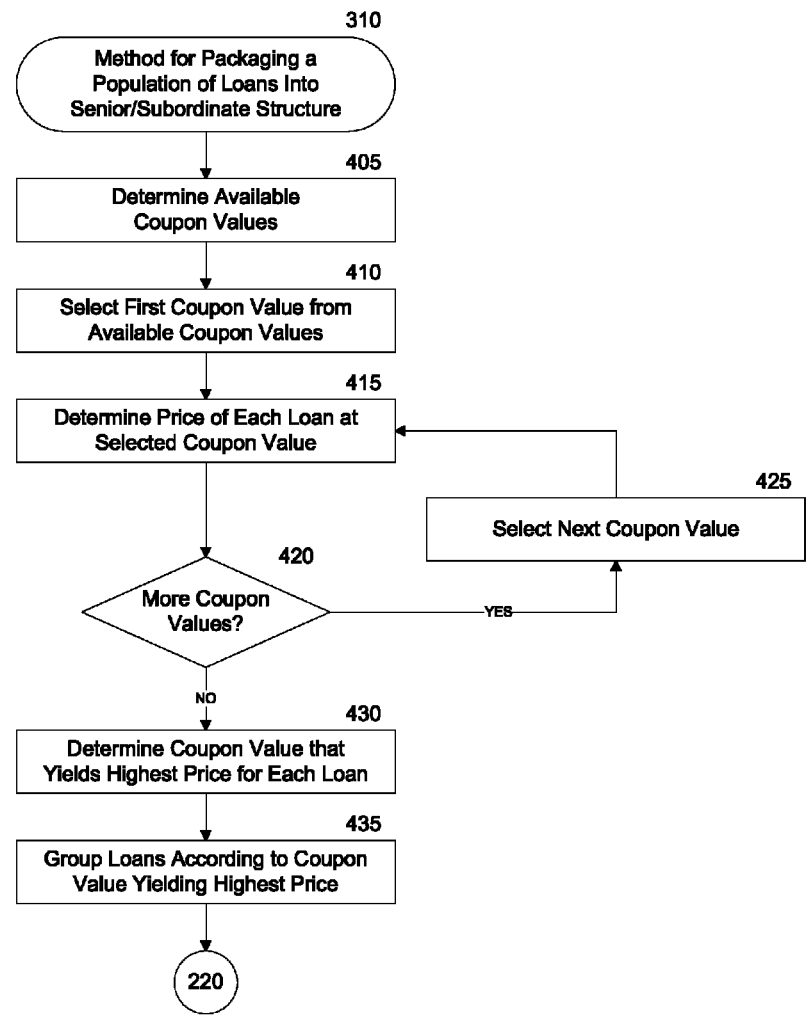
FIG. 4 is a flow chart depicting a method for packaging a population of loans into a senior/subordinate structure in accordance with one exemplary embodiment of the present invention.

FIG. 4 is a flow chart depicting a method 310 for packaging a population of loans into a senior/subordinate bond structure in accordance with one exemplary embodiment of the present invention. As briefly discussed above with reference to FIG. 1, a senior/subordinate bond structure is a structure where bonds with different credit ratings are created. Typically, the senior/subordinate bond structure includes a senior tranche of bonds having a AAA or similar credit rating and a subordinate tranche of bonds having a lower credit rating. The senior tranche is protected from a certain level of loss by the subordinate tranche as the subordinate tranche incurs the first losses that may occur. The senior trance can be sold to investors desiring a more conservative investment having a lower yield, while the subordinated tranche can be sold to investors willing to take on more risk for a higher yield. For the purpose of this application, a AAA rated bond refers to a bond in the senior tranche, but not necessarily a bond having a credit rating of AAA.

Additionally, interest only (IO) and principal only (PO) bonds may be created in a senior/subordinate structure. An IO bond is created when the net coupon of a loan is more than the coupon of the bond in which the loan executes. Thus, the difference in the loan coupon and the bond coupon creates an interest only cash flow. Similarly, when the loan coupon is less than the bond coupon, a PO bond is created which receives only principal payments.

Referring to FIGS. 1 and 4, at step 405, the senior/subordinate module 121 determines the bond coupons that are available for executing the loans into. The senior/subordinate module 121 may obtain the available bond coupons from a data source 150 or may receive the available bond coupons from the user by way of the user interface 115 in step 205 of FIG. 2. For example, the user may desire to execute the loans into bonds having coupon values between 4.5% and 7.0%.

At step 410, the senior/subordinate module 121 selects a first bond coupon value from the range of available bond coupon values. This first coupon value can be the lowest bond coupon value, the highest coupon value, or any other bond coupon value in the range of available bond coupon values.

At step 415, the senior/subordinate module 121 determines the execution price of each loan in the population of loans at the selected coupon value. Each loan in the population of loans is structured as a bond. The cash flow of each loan is distributed into symbolic AAA and subordinate bonds, and depending on the coupon of the loan and the selected bond coupon, an IO or PO bond. The principal payment and interest cash flows of each loan is generated in each period accounting for loan characteristics of the loan, such as IO period, balloon terms, and prepayment characteristics. The cash flow generated in each period is distributed to all bonds that the loan executes taking into account shifting interest rules that govern the distribution of prepayments between the AAA and the subordinate bonds in each period. The proportion in which the principal payments are distributed depends on the subordination levels of the AAA and the subordinate bonds. The subordination levels are a function of the loan attributes and are supplied by rating agencies for each loan through an Application Program Interface (API) coupled to the computing device 110. Prepayments are first distributed pro rate to the PO bond and then between the AAA and the subordinate bonds based on the shifting interest rules. Any remaining prepayment is distributed proportionally among all the subordinate bonds. The interest payment for each of the bonds is a direct function of the coupon value for the bond.

After the cash flows of each of the bonds for each of the loans have been generated, the present value of these cash flows is determined. For fixed rate loans, the AAA bonds can be priced as a spread to the To Be Announced (TBA) bond prices. However, the subordinate bond cash flows are discounted by a spread to the U.S. Treasury Yield Curve. The TO and PO bonds are priced using the Trust TO and PO prices. Finally, the price of the AAA bond, the subordinate bonds, and the TO or PO bond is combined proportionally for each loan based on the bond sizes to get the final bond price for each loan. This final bond price is the price of the loan executing into the bond given the selected coupon value of the bond.

At step 420, the senior/subordinate module 121 determines if there are more bond coupon values in the range of available bond coupon values. If there are more bond coupon values, the method 310 proceeds to step 425. Otherwise, the method 310 proceeds to step 430.

At step 425, the next bond coupon value in the range of available bond coupon values is selected. In one exemplary embodiment, the senior/subordinate module 121 can increment from the previous selected bond coupon value (e.g. 0.5% increments) to determine the next bond coupon value. In an alternative embodiment, the senior/subordinate module 121 can progress through a fixed list of bond coupon values. For example, the user may select specific bond coupon values to execute the loans into, such as only 4.0%, 5.0%, and 6.0%. After the next bond coupon value is selected, the method 310 returns to step 415 to determine the execution price of each loan in the population of loans at the new coupon value.

At step 430, the senior/subordinate module 121 determines, for each loan in the population of loans, which bond coupon value yielded the highest final bond price for that particular loan.

At step 435, the senior/subordinate module 121 groups the loans according to the bond coupon value that yielded the highest final bond price for each loan. For example, if the available bond coupon values are 4.0%, 5.0%, and 6.0%, each loan that has a highest final bond price at 4.0% are grouped together, while each loan that has a highest final bond price at 5.0% are grouped together, and each loan that has a final bond price at 6.0% are grouped together. After step 435 is complete, the method proceeds to step 220 (FIG. 2).

In the embodiment of FIG. 4, the subordinate bonds for each loan execute at the same bond coupon value as the corresponding AAA bond. For example, if a first loan of 6.25% best executes into a bond having a coupon value of 6.0%, then a AAA bond of 6.0% and a subordinate bond that is priced at U.S. Treasury spreads specified for execution coupon 6.0% is created. If a second loan of 5.375% best executes into a bond having a coupon value of 5.0%, then a AAA bond of 5.0% and a subordinate bond that is priced at U.S. Treasury spreads specified for execution coupon 5.0% is created. This creates two AAA bonds and two subordinate bonds at two different coupon values.

Typically, when loans are packaged in a senior/subordinate bond structure, multiple AAA bonds with multiple coupon values are created with a common set of subordinate bonds that back all of the AAA bonds. This set of subordinate bonds is priced at the weighted average (WA) execution coupon of all of the AAA bonds created for the loan package. Pricing the subordinate bonds at the WA execution coupon implies that the spread to the benchmark U.S. Treasury curve, which is a function of the bond rating and the execution coupon of the subordinate bond, has to be chosen appropriately. In order to know the WA execution coupon of all the AAA bonds for the population of loans, the best execution coupon for each loan in the population of loans has to be known. In order to know the best execution coupon of each loan, the loan has to be priced at different bond coupon values and the AAA and subordinate bonds created at those coupons also have to be priced. However, the subordinate bond cash flows are discounted with spreads to the U.S. Treasury, with spreads taken at the WA best execution coupon which is still unknown. This creates a circular dependency as the best execution of each loan in the population of loans now depends on all the other loans in the population.

Figure 5:
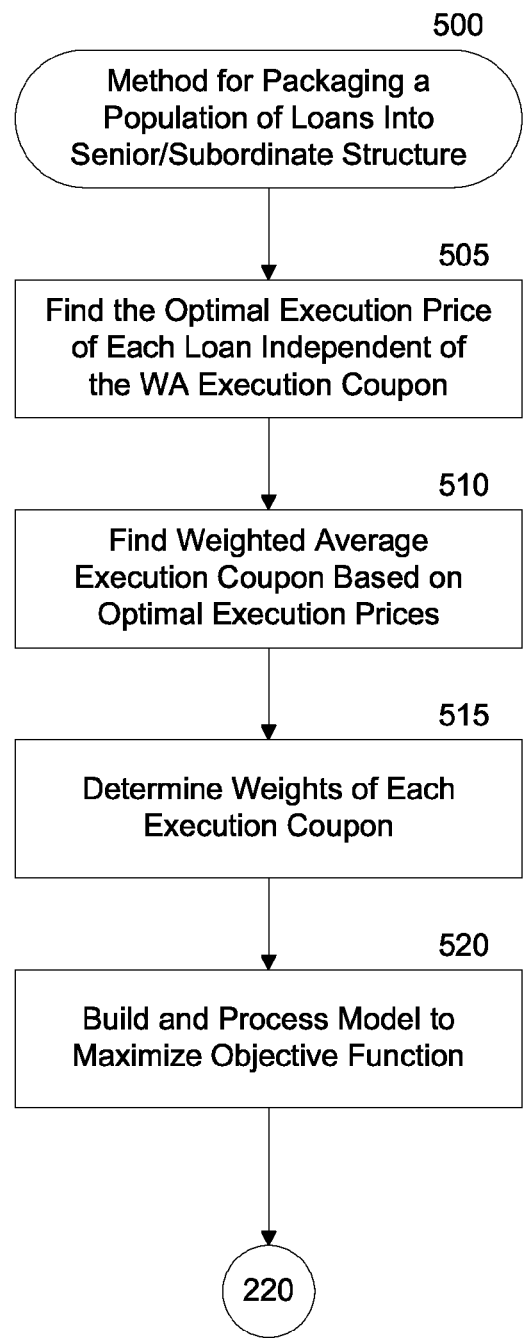
FIG. 5 is a flow chart depicting a method for packaging a population of loans into a senior/subordinate structure in accordance with one exemplary embodiment of the present invention.

FIG. 5 is a flow chart depicting a method 500 for packaging a population of loans into a senior/subordinate structure in accordance with one exemplary embodiment of the present invention. The method 500 is an alternative method to that of method 310 of FIG. 4, accounting for pricing subordinate bonds at the WA execution coupon and provides a solution to the circular dependency discussed above.

The WA execution coupon for a population of loans can be calculated by:

$$\text{WA Execution Coupon} = \{\text{Sum}_i(x_{i0}d_0 + x_{i1}d_1 + \ldots + x_{ij}d_j) \cdot b_i\}/\{\text{Sum}_i b_i\} \quad [1]$$

In Equation [1], $x_{ij}$ is a binary variable with a value of either "0" or "1," whereby a value of "1" indicates that the $i^{th}$ loan is optimally executing at the $j^{th}$ execution coupon value. The parameters $d_0$ to $d_j$ represent the j execution coupon values. For example, the coupons values could range from 4.5% to 7.0%. Finally, the parameter $b_i$ represents the balance of the $i^{th}$ loan.

If $q_o$ to $q_j$ are the weights of the j execution coupons, then:

$$q_0 + q_1 + \ldots + q_j = 1 \quad [2]$$

$$q_0 d_0 + q_1 d_1 + \ldots + q_j d_j = \text{WA Execution Coupon} \quad [3]$$

where $q_0$ to $q_1$ are special ordered sets of type two, which implies that at most two are non-zero and the two non-zero weights are adjacent.

Let $Pa_{ij}$ be the price of the AAA bond when loan i executes at coupon j. Next, let $Ps_{ij}$ be the overall price of all of the subordinate bonds combined when loan i executes at coupon j. Finally, let $Pio_{ij}$ and $Ppo_{ij}$ be the prices of the IO and PO bonds respectively when loan i executes at coupon j.

The AAA bond prices and the IO and PO bond price components of loan i executing at coupon j are linear functions of $x_{ij}$. The AAA priced as a spread to the TBA is a function of the execution coupon of the AAA bond and the IO/PO prices are a lookup based on collateral attributes of the loan. However, pricing the subordinate bonds is complicated because the subordinate cash flows are discounted at the WA execution coupon.

Let $P^i$ be a matrix of size j*j that contains the prices of the subordinate bonds. The (m,n) entry of the matrix represents the price of the subordinate cash flows when the cash flow of loan i is generated assuming that loan i executes at the $m^{th}$ coupon and is discounted using subordinate spreads for the $n^{th}$ coupon. Subordinate spreads to the U.S. Treasury are a function of the execution coupon and any product definition, such as the size (e.g. Jumbo/Conforming), maturity (e.g. 15/30 years), etc. The price of the subordinate bond of the $i^{th}$ loan can be written as:

$$q_0(x_{i0}P^i_{(0,0)} + \ldots + x_{ij}P^i_{(0,j)}) + \ldots + q_j(x_{i0}P^i_{(j,0)} + \ldots + x_{ij}P^i_{(j,j)}) \quad [4]$$

which is a non linear expression as the equation contains a product of q and $x_{ij}$, both of which are variables in this equation.

FIG. 5 provides a method 500 for overcoming this non-linearity. Referring to FIG. 5, at step 505, the senior/subordinate module 121 determines the optimal execution price for each loan in the population of loans independent of the WA execution coupon. In one exemplary embodiment, the senior/subordinate module 121 employs the method 310 of FIG. 4 to find the optimal execution price for each loan.

At step 510, the senior/subordinate module 121 determines the WA execution coupon corresponding to the optimal execution price for each loan. This WA execution coupon can be found using Equation [1] above.

At step 515, the senior/subordinate module 121 determines the weights (i.e. $q_0-q_j$) of each execution coupon for the WA execution coupon found in step 510. These weights can be found using Equation [3] above.

At step 520, the senior/subordinate module 121 builds a model including an objective function to determine the optimal execution coupon for each loan to maximize the total market value of all of the bonds in the senior/subordinate structure. The expression of the objective function contains i*j terms, where the ij term represents the market value of executing the $i^{th}$ loan at the $j^{th}$ execution coupon. After inserting the values of the weights of the execution coupons (i.e. q's) into the expression for subordinate bond price (Equation [4]), only two of the terms will be non-zero for the sub-price of the $i^{th}$ loan executing at the $j^{th}$ execution coupon.

As the method 200 of FIG. 2 iterates step 215, different WA execution coupons can be used to maximize the objective function. The iterations can begin with the WA execution coupon found in step 510 and the senior/subordinate module 121 can search around this WA execution coupon until either the optimal solution is found or the user decides that a solution of sufficient high quality is found in step 220 of FIG. 2. In other words, the senior/subordinate module 121 searches for an optimal solution by guessing several values of the WA execution coupon around an initial estimate of the optimal execution coupon. After a final solution is found by the senior/subordinate module 121, the loans can be grouped based on the coupon values for each loan in the final solution to the objective function.

In some instances, one of the undesirable effects of the senior/subordinate bond structure is the creation of IO and/or PO bonds, which may not trade as rich as AAA bonds. In some exemplary embodiments, the senior/subordinate module 121 can ameliorate this issue by considering a loan as two pseudo loans. For example, a loan having a net rate of 6.125% and a balance of $100,000 can be considered equivalent to two loans of balance b1 and b2 and coupons 6% and 6.5% such that the following conditions are satisfied:

$$b1 + b2 = 100{,}000 \quad [5]$$

$$((b1 \cdot 6.0) + (b2 \cdot 6.5))/(b1 + b2) = 6.125 \quad [6]$$

The first condition conserves the original balance, while the second condition is to set the WA coupon of the two pseudo loans to equal the net rate of the original loan. Solving these equations for b1 and b2, we find that b1=75,000 and b2=25,000. These two loans, when executed at 6.0% and 6.5% bond coupons respectively, avoids the creation of either an IO bond or a PO bond.

Although in the above example two adjacent half point coupons were used to create the two pseudo loans, two coupons from any of the half point bond coupons that are being used to create the bonds can be used. For example, if only bond coupons from 4.5% to 7.0% are being used to create the bonds, there would be fifteen combinations to consider (6C2=15). In some cases, the best solution is not to split the loan into two adjacent half point bond coupons. For example, this split may not be optimal if the AAA spreads at the two adjacent half point coupons are far higher than the ones that are not adjacent to the net balance of the loan.

The senior/subordinate module 121 can construct a linear program or linear objective function to determine the optimal split into pseudo loans. The output of the linear program is the optimal splitting of the original loan into pseudo loans such that the overall execution of the loan is maximized, subject to no IO bond or PO bond creation. For each loan i, let variable $x_{ij}$ indicate the balance of loan i allocated to the jth half point coupon, subject to the constraint that the sum of over $x_{ij}$ for all j equals to the balance of loan i and the WA coupon expressed as a function of the $x_{ij}$'s equals to the net coupon of loan i, similar to Equation [6] above. Let the execution coupons be $r_0$ to $r_n$. Thus, this equation becomes:

$$(x_{i0}r_0 + \ldots + x_{in}r_n)/b_i = c_i \qquad [7]$$

where $b_i$ is the balance of loan i and $c_i$ is the net coupon of loan i. The price of loan i executing at coupon j is the sum of the price of the AAA bond and the subordinate bonds. No IO or PO bonds are created when the coupons are split. The senior/subordinate module 121 calculates the price of the AAA bond as a spread to the TBA, where the spread is a function of the execution coupon j. In one embodiment, the senior/subordinate module 121 also calculates the price of the subordinate bond as a spread to the TBA for simplification of the problem. Cash flows are not generated as the split of the balances to different execution coupons is not yet known. The senior/subordinate module 121 combines the price of the subordinate bond and the AAA bond in proportion to the subordination level of loan i, which can be input by a user in step 205 of FIG. 2 or input by an API. At this point, the senior/subordinate module 121 has calculated the price of loan i ($P_{ij}$) for each execution coupon j. To determine the optimal splitting of the original loan into pseudo loans, the senior/subordinate module 121 creates the following objective function and works to maximize this objective function:

$$\text{Max}: P_{i0}x_{i0} + \ldots + P_{in}x_{in} \qquad [8]$$

Equation [8] is a simple linear program with two constraints and can be solved optimally. The solution gives the optimal split of the loan into at most two coupons and thus, a bond can be structured without creating any IO or PO bonds. The user can determine if the bond should be split or not based on the optimal execution and other business considerations.

Figure 6:
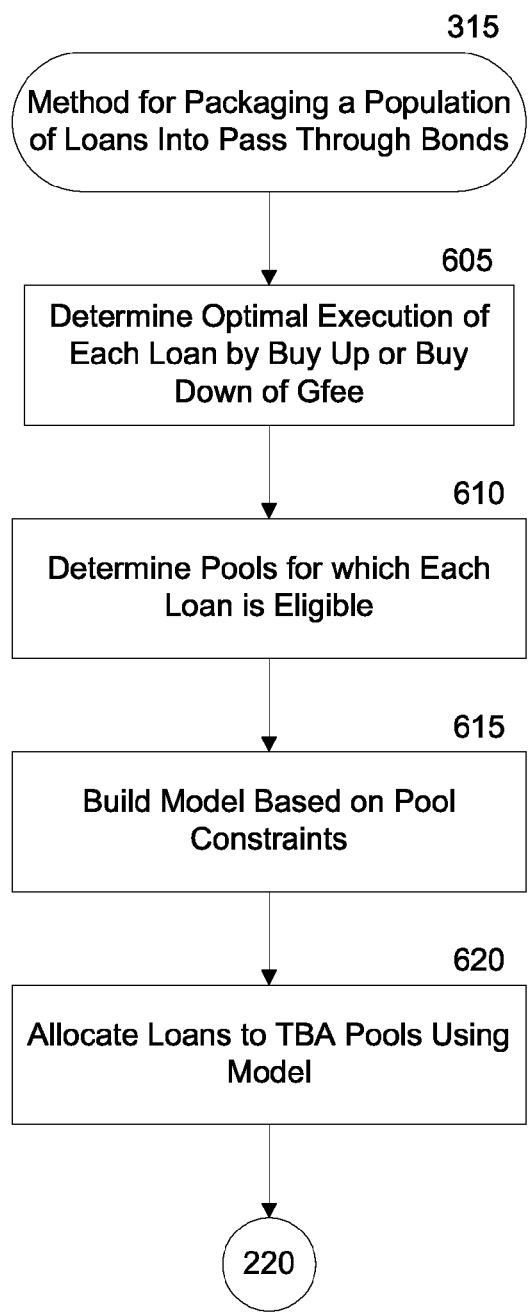
FIG. 6 is a flow chart depicting a method for packaging a population of loans into pass through bonds in accordance with one exemplary embodiment of the present invention.

FIG. 6 is a flow chart depicting a method 315 for packaging a population of loans into pass through bonds in accordance with one exemplary embodiment of the present invention. A pass through bond is a fixed income security backed by a package of loans or other assets. Typically, as briefly discussed above with reference to FIG. 1, a pass through bond is guaranteed by a government agency, such as Freddie Mac or Fannie Mae. The government agency guarantees the pass through bond in exchange for a guarantee fee (Gfee). The Gfee can be an input provided by the agencies for a specific set of loans or can be specified as a set of rules based on collateral characteristics. Regardless of how the Gfee is obtained, the Gfee for a loan set is known.

When loans are securitized as a pass through bond, one has the option to buy up or buy down the Gfee in exchange for an equivalent fee to the agencies. Buying up the Gfee reduces the net coupon and thus the price of the bond as well. This upfront buy up fee is exchanged in lieu of the increased Gfee coupon. Similarly, buying down the Gfee reduces the Gfee and increases the net coupon and therefore increases the bond price. An upfront fee is paid to the agencies to compensate for the reduced Gfee.

The Fannie Mae and Freddie Mac agencies typically provide buy up and buy down grids each month. Referring to FIG. 1, these grids can be stored in a data source 150 or in the data storage unit 125 for access by the pass-thru module 122 of the loan trading optimizer 120. If the Gfee is bought up or bought down, an excess coupon is created. The amount of buy up or buy down of Gfee can vary based on collateral attributes of the loan and can also be subject to a minimum and maximum limit.

Referring now to FIGS. 1 and 6, at step 605, the pass-thru module 122 determines the optimal execution of each loan by buy up or buy down of the Gfee. In one exemplary embodiment, the optimal execution of each loan is determined by finding the overall price of the loan for each available buy up and buy down of the Gfee. Typically, a Gfee can be bought up or down in increments of $1/100^{th}$ of a basis point. The pass-thru module 122 implements a loop for each loan from the minimum to the maximum Gfee buy up with a step size of $1/100^{th}$ of a basis point. Similarly, the pass-thru module 122 implements a loop for each loan from the minimum to the maximum Gfee buy down with a step size of $1/100^{th}$ of a basis point. In each iteration, the amount of Gfee buy up or buy down is added to the current net rate of the loan. From this modified net rate of the loan, the TBA coupon is determined as the closest half point coupon lower than or equal to the modified net rate. The excess coupon is equal to the modified net rate of the TBA coupon and the price of the excess coupon is a lookup in the agency grid. The fee for the buy up or buy down is also a lookup in the agency grid. The price of the TBA coupon is a lookup from the TBA price curve. When the Gfee is bought up, the cost is added to the overall price and when the Gfee is bought down, the cost is subtracted from the overall price. The pass-thru module 122 determines the overall price of execution for the loan at each iteration and determines the optimal execution for the loan as the execution coupon of the TBA for which the overall price is maximized. This overall cost is the combination of the price of the TBA coupon, the price of the excess coupon, and the cost of the Gfee (added if buy up, subtracted if buy down).

At step 610, the pass-thru module 122 determines which TBA pools each loan is eligible for. Pooling loans into TBA bonds is a complex process with many constraints on pooling. Furthermore, different pools of loans have pool payups based on collateral characteristics. For example, low loan balance pools could prepay slower and thus may trade richer. Also, loan pools with geographic concentration known to prepay faster may trade cheaper and thus have a negative pool payup. Thus, pooling optimally taking into account both the constraints and the pool payups can lead to profitable execution that may not be captured otherwise.

Each of the TBA pools for which a loan can be allocated has a set of pool eligibility rules and a pool payup or paydown. Non-limiting examples of pools can be a low loan balance pool (e.g. loan balances less than $80K), a medium loan balance pool (e.g. loan balance between $80K and $150K), a high loan balance pool (e.g. loan balances above $150K), a prepay penalty loan pool, and an interest only loan pool. For a loan to be allocated to a specific pool by the pass-thru module 122, the loan has to satisfy both the eligibility rules of the pool and also best execute at the execution coupon for that pool.

The pass-thru module 122 applies the eligibility rules of the TBA bond pools to the loans to determine the TBA bond pools for which each loan is eligible. The pass-thru module 122 can utilize pool priorities to arbitrate between multiple pools if a loan is eligible for more than one pool. If a loan is eligible to be pooled into a higher and lower priority pool, the pass-thru module 122 allocates the loan to the higher priority pool. However, if a loan is eligible for multiple pools having the same priority, the pass-thru module 122 can allocate the loan into either of the pools having the same priority.

At step 615, the pass-thru module 122 builds a model for allocating the loans into TBA pools based on the constraints of each TBA bond pool. Let $x_{ij}$ be a binary variable with a value of "1" or "0" which has a value of "1" when loan i is allocated to TBA bond pool j. The total loan balance and loan count constraints of the TBA pools are linear functions of the $x_{ij}$ variables. The objective function for this model is also a linear combination of the market values of each loan. The primary problem in this model is that the given loan population selected in step 210 of FIG. 2 may not be sufficient to allocate all TBA loan pools, as some of the pools may not have loans to satisfy the balance and count constraints or the loans may not be eligible for those pools. In such cases, it is desirable for the pools to have the constraints when applicable. If there are some pools for which there are not enough loans in the population of loans to form a pool, then such pools are not subjected to the specified constraints while the other pools are. However, it is not possible to know a-priori which pools do not have enough loans to satisfy the constraints. Thus, the model employs conditional constraints to allow constraints to be applicable to only those pools which are allocated.

The pooling model is modified to allow for some loans to not be allocated to any pool. This non-allocation will ensure that the model is always solvable and is similar to introducing a slack variable in linear programming. Thus, for each loan in the population of loans, there is an additional binary variable representing the "unallocated pool" into which the loan can be allocated. Those loans allocated to the unallocated pool are given a zero cost/market value, thus encouraging the pass-thru module 122 to allocate as many loans as possible.

The next step in building this pooling model is to introduce p binary variables for the p possible TBA pools. A value of "1" indicates that this pool is allocated with loans satisfying the pool constraints and a value of "0" indicates that this pool is not allocated. These variables are used to convert simple linear constraints into conditional constraints.

Each constraint of each pool is converted to conditional constraints for the pooling model. To detail this conversion, a maximum loan count constraint is considered for pool P. Let $x_1$ to $x_n$ be binary variable where $x_i$ are the loans eligible for pool P. Next, let $x_1 + \ldots + x_n = U$, where U equals the total number of loans in pool P. Finally, let w be the binary variable to indicate if pool P is allocated. The user constraint for maximum loan count is specified as $U \leq K$, where K is given by the user. In order to impose this constraint conditionally, this constraint is transformed to the following two constraints:

$U \leq K\,w$ $U \leq M\,w$ where M is a constant such that the sum of all $x_i$'s is bounded by M. Consider both the cases when pool P is allocated (w=1) and when pool P is not allocated (w=0) below:

w=1: $U \leq K$ (required)

$U \leq M$ (redundant)

w=0: $U \leq 0$ $U \leq 0$

The only way for $U \leq 0$ would be when all the $x_i$'s are "0" and thus, pool P will be unallocated.

Other constraints, such as minimum count, minimum balance, maximum balance, average balance, and weighted average constraints can be transformed similarly for the pooling model. After all of the constraints are transformed to conditional constraints, the pooling model is ready to handle constraints conditionally.

At step 620, the pass-thru module 122 executes the pooling model to allocate the loans into TBA pools. After the pass-thru module 122 executes the model for one iteration, the method 315 proceeds to step 220 (FIG. 2). As the method 200 of FIG. 2 iterates step 215, different TBA pool allocations are produced by the pass-thru module 122 until either the optimal TBA pool allocation is found or until the user decides that a solution of sufficient high quality is found in step 220 (FIG. 2).

Figure 7:
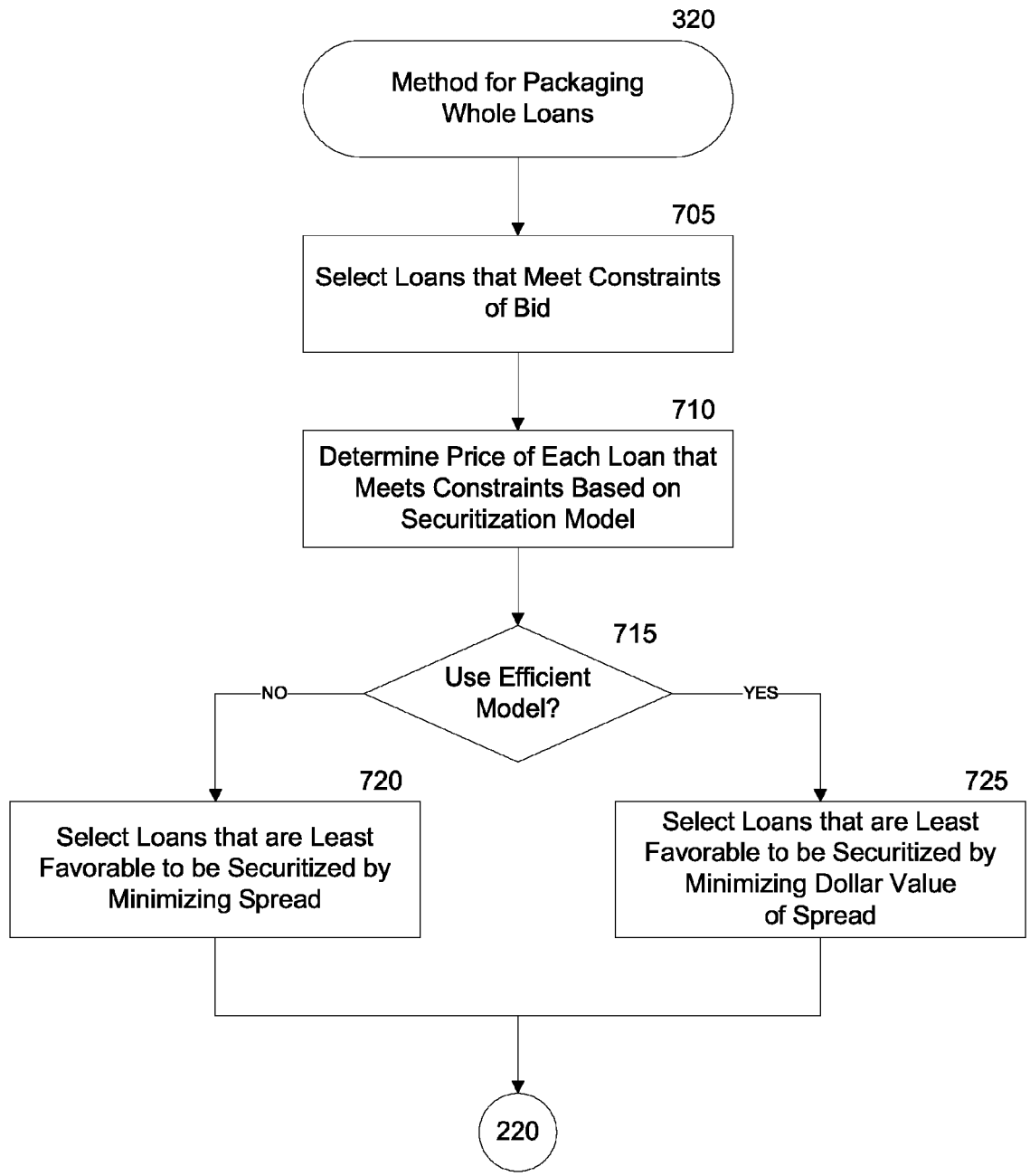
FIG. 7 is a flow chart depicting a method for packaging whole loans in accordance with one exemplary embodiment of the present invention.

FIG. 7 is a flow chart depicting a method 320 for packaging whole loans in accordance with one exemplary embodiment of the present invention. The method 320 identifies an optimal package of loans meeting a set of constraints given by a customer or investor. In this embodiment, the loan package is optimized by determining which loans, among the population of loans that meet the constraints, are least favorable to be securitized. Although the method 320 of FIG. 7 is discussed in terms of the senior/subordinate bond structure, other bonds structures or models can be used.

Referring to FIG. 7, at step 705, the whole loan module 123 determines which loans in the population of loans meets constraints of a bid for whole loans. Investment banks and other financial institutions receive bids for whole loans meeting specific requirements. These requirements can be entered into the user interface 115 at step 205 of FIG. 2 and/or stored in the data storage unit 125 or a data source 150. The constraints can include requirements that the loans must satisfy, such as, for example, minimum and maximum balance of the total loan package, constraints on the weighted average coupon, credit ratings of the recipients of the loans (e.g. FICO score), and loan-to-value (LTV) ratio. The constraints can also include location based constraints, such as no more than 10% of the loan population be from Florida and no zip code should have more than 5% of the loan population.

After the whole loan module 123 selects the loans that meet the constraints, at step 710, the whole loan module 123 determines the price of each loan that meets the constraints based on a securitization module. For example, the price of the loans may be calculated based on the senior/subordinate structure discussed above with reference to FIGS. 4 and 5.

At step 715, the whole loan module 123 determines whether to use an efficient model to select loans least favorable to be securitized by minimizing the dollar value of the spread of execution of the loans based on a securitization model or a less efficient model to select loans least favorable to be securitized by minimizing the spread of execution of the loans based on a securitization model. In one exemplary embodiment, this determination can be based on the total number of loans in the population or chosen by a user. If the whole loan module 123 determines to use the efficient model, the method 320 proceeds to step 725. Otherwise, the method 320 proceeds to step 720.

At step 720, the whole loan module 123 selects loans that are least favorable to be securitized by minimizing the spread of execution of the loans based on the senior/subordinate bond structure. The whole loan module 123 builds a model to select a subset of the loans that meet the constraints such that the WA price of the loans of this subset net of the TBA price of the WA coupon of this subset is minimized. The TBA price of the WA coupon of the subset is typically higher as the TBA typically has a better credit quality and hence the metric chosen will have a negative value. The objective function that needs to be minimized is given by:

$$(x_1 b_1 p_1 + \ldots + x_n b_n p_n)/(x_1 b_1 + \ldots + x_n b_n) - (q_1 p x_1 + \ldots + q_m p x_m) \quad [9]$$

In Equation [9], $x_1$ to $x_n$ are binary variables with a value of either "0" or "1", whereby a value of "1" indicates that the loan is allocated and "0" otherwise. The variables $b_1$ to $b_n$ are the balances of the loans and $p_1$ to $p_n$ are the prices of the loans as determined in step 710. The variables $q_1$ to $q_m$ are the weights for each of the half point coupons and $px_1$ to $px_m$ are the TBA prices for the half point coupons. The weights are special ordered sets of type two, which as discussed above, implies that at most two are non-zero and the two non-zero weights are adjacent. Thus, the expression $(q_1 p x_1 + \ldots + q_m p x_m)$ is the price of the WA coupon of the allocated loans.

The weights $(q_1 - q_m)$ are subject to the constraints:

$$q_1 + \ldots + q_m = 1 \quad [10]$$

$$(x_1 b_1 c_1 + \ldots + x_n b_n c_n)/(x_1 b_1 + \ldots + x_n b_n) = (q_1 r_1 + \ldots + q_m r_m) \quad [11]$$

where the $c_i$'s are the net coupons on the loans and the $r_i$'s are the half point coupons of the TBA curve.

An illustrated weighted average constraint (Kwac) on the coupon could be:

$$(x_i b_i c_i + \ldots + x_j b_j c_j)/(x_i b_i + \ldots + x_j b_j) <= K\text{wac} \quad [12]$$

Let $y_0 = M/(x_1 b_1 + \ldots + x_n b_n)$ and $y_j = x_j y_0$ where M is a scaling constant to keep the model scaled sensibly. Rewriting the equations, the objective function to minimize is:

$$\text{Min:}((y_1 b_1 p_1)/M + \ldots + (y_n b_n p_n)/M) - (q_1 p x_1 + \ldots + q_m p x_m) \quad [13]$$

such that:

$$((y_1 b_1 c_1)/M + \ldots + (y_n b_n c_n)/M) = q_1 r_1 + \ldots + q_m r_m \quad [14]$$

and:

$$q_1 + \ldots + q_m = 1 \quad [15]$$

and:

$$(x_i b_i c_i + \ldots + x_j b_j c_j) <= (x_i b_i + \ldots + x_j b_j) K\text{wac} \quad [16]$$

Multiplying Equation [16] by $y_0$ yields:

$$(y_i b_i c_i + \ldots + y_j b_j c_j) <= (y_i b_i + \ldots + y_j b_j) K\text{wac} \quad [17]$$

Additionally, other constraints for loan balance and ratio balance can similarly be transformed into linear constraints. In this exemplary embodiment, the y's are real numbers and the y's should be equal to $y_0$ when that loan is allocated, else the y should equal "0." This requirement can be enforced by adding additional constraints and variables:

$$y_i \geq 0 \quad [18]$$

$$y_i \leq K z_i \quad [19]$$

$$y_i - y_0 - K z_i \geq -K(1+eps) \quad [20]$$

$$y_i - y_0 + K z_i \leq K(1+eps) \quad [21]$$

The equations above are analyzed when $z_i$ is set to "1" and $z_i$ is set to "0" and which shows that $y_i$ will be $y_0$ or zero within a tolerance of eps. Eps is a model specific constant and is suitably small to account for lack of numerical precision in a binary variable. The tolerance eps is utilized in this model as although binary variables are supposed to be "0" or "1," the binary variables suffer from precision issues and thus, the model should accommodate numerical difficulties. The source of this precision issue is the way $y_0$ has been defined. The denominator of $y_0 = M/(x_1 b_1 + \ldots + x_n b_n)$ is essentially the sum of the balances of all loans in the pool, which can be a very large number resulting in a small $y_0$.

After building the model, the whole loan module 123 minimizes the objective function in Equation [13] with each iteration of step 215 of FIG. 2 while maintaining the constraints of the subsequent equations [17]-[21]. The loans that are allocated into the whole loan package are the loans that meet the constraints of the bid and have a y value equal to $y_0$. After step 720 is completed, the method 320 proceeds to step 220 (FIG. 2).

At step 725, the whole loan module 123 selects loans that are least favorable to be securitized by minimizing the dollar value of the spread of execution of the loans based on the senior/subordinate bond structure. Thus, the difference of the market value of the allocated loans and the notional market value of the loan pool using the price of the WA execution coupon is minimized. The objective function that needs to be minimized for this model is given by:

$$\text{Min:}(x_1 b_1 p_1 + \ldots + x_n b_n p_n) - (x_1 b_1 + \ldots + q_m p x_m) \quad [22]$$

$$\text{Let } y_i = q_i (x_1 b_1 + \ldots + x_n b_n) \quad [23]$$

Rewriting Equation [22] yields:

$$\text{Min:}(x_1 b_1 p_1 + \ldots + x_n b_n p_n) - (y_1 p_1 + \ldots + y_m p x_m) \quad [24]$$

such that:

$$q_1 + \ldots + q_m = 1 \quad [25]$$

$$(x_1 b_1 c_1 + \ldots + x_n b_n c_n)/(x_1 b_1 + \ldots + x_n b_n) = q_1 r_1 + \ldots + q_m r_m \quad [26]$$

which gets transformed to:

$$(x_1 b_1 + \ldots + x_n b_n)(q_1 + \ldots + q_m) = (x_1 b_1 + \ldots + x_n b_n) \quad [27]$$

$$y_1 + \ldots + y_m = (x_1 b_1 + \ldots + x_n b_n) \quad [28]$$

$$(x_1 b_1 c_1 + \ldots + x_n b_n c_n) = y_1 r_1 + \ldots + y_m r_m \quad [29]$$

After building the model, the whole loan module 123 minimizes the objective function in Equation [24] with each iteration of step 215 of FIG. 2 while maintaining the constraints of the subsequent equations [25]-[29]. The loans that are allocated into the whole loan package are the loans that meet the constraints of the bid and have a y value equal to $y_0$. After step 725 is completed, the method 320 proceeds to step 220 of FIG. 2.

Figure 8:
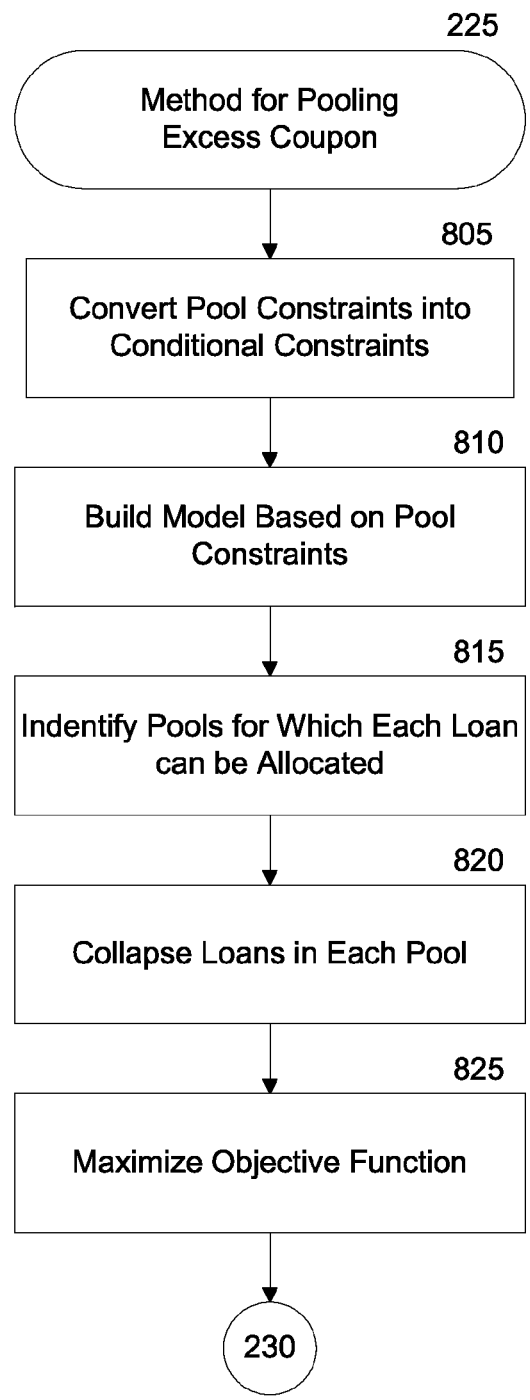
FIG. 8 is a flow chart depicting a method for pooling excess coupon in accordance with one exemplary embodiment of the present invention.

FIG. 8 is a flow chart depicting a method 225 for pooling excess coupon in accordance with one exemplary embodiment of the present invention. The excess coupon module 124 can pool the excess coupon of securitized loans into different tranches or pools. The excess coupon module 124 can take a large population of loans (e.g. 100 thousand or more), each with some excess coupon, and pool the loans into different pools, each pool with a different coupon and specified eligibility rules. Each of the pools can also have a minimum balance constraint. Pools that are created with equal contribution of excess coupon from every loan that is contributing to that pool typically trades richer than pools that have a dispersion in the contribution of excess from different loans. Therefore, it is profitable to create homogeneous pools.

Referring to FIG. 8, at step 805, the excess coupon module 124 converts the pool constraints into conditional constraints as some of the pools defined in this excess coupon model may not have loans to satisfy the pool constraints. This conversion is similar to the conversion of constraints discussed above with reference to FIG. 6.

At step 810, the excess coupon module 124 builds a model to determine the optimal pooling for the excess coupons. Let $x_{ij}$ be the contribution of excess coupon from loan i to pool j. Unlike the pooling model in FIG. 6 above, this variable is not a binary variable. However, an unallocated pool is added to the set of user defined pools which enables the pass-thru module 122 to always solve the model and produce partial allocations. The first constraint of this excess coupon model is the conservation of excess coupon allocated among all the pools for each loan. Any loan that does not get allocated to a user defined pool is placed in the unallocated pool, and thus the unallocated pool is also included in the conservation constraint. In this embodiment, the unallocated pool does not have any other constraint. The objective function of this excess coupon model is to maximize the total market value of the excess that gets allocated. Unallocated excess coupon is assigned a zero market value and thus the solver tries to minimize the unallocated excess coupon. In this model, the excess coupon module 124 tries to create the maximum possible pools with equal excess contribution. Any leftover excess from all the loans can be lumped into a single pool and a WA coupon pool can be created from this pool.

An aspect of this excess coupon model is to enforce equality of the excess coupon that gets allocated from a loan to a pool. Furthermore, it is not necessary that all loans allocate excess to a given pool. Thus, the equality of excess is enforced only among loans that have a non-zero contribution of excess to this pool.

Let $xp_0$ to $xp_p$ be p real variables that indicate the amount of excess in each pool. Also, let $w_{ij}$ be a binary variable that indicates if loan i is contributing excess to pool. For each eligible loan i, for pool j, the following constraints are added:

$$x_{ij} \leq M^* w_{ij} \qquad [+]$$

$$x_{ij} \leq xp_j \qquad [31]$$

$$x_{ij} \geq xp_j - M(1 - w_{ij}) \qquad [32]$$

When $w_{ij}=1$ (loan does not contribute excess to this pool), then:

$$x_{ij} \leq M \qquad [33]$$

$$x_{ij} \leq xp_j \qquad [34]$$

$$x_{ij} \geq xp_j \qquad [35]$$

Thus, $x_{ij}$ is equal to $x_{pj}$, the excess coupon of the pool. When $w_{ij}=0$, then:

$$x_{ij} \leq 0 \qquad [36]$$

$$x_{ij} \leq xp_j \qquad [37]$$

$$x_{ij} \geq xp_j - M \qquad [38]$$

When M is chosen to be the maximum excess coupon of all loans in the allocation, the expression $xp_j-M$ is negative. Thus, from $x_{ij} \leq 0$ and that all excess coupons have to be zero or positive, this implies that $x_{ij}=0$ when $w_{ij}=0$.

This excess coupon model can be difficult to solve because of its complexity level. In order to reduce the complexity, the excess coupon module 124 employs dimensionality reduction. The first step of this process is to identify the pools into which a loan can be allocated. Eligibility filters in this excess coupon model specify the mapping of the collateral attributes of the loans to the coupons of the pools that the attributes can go into. For example, loans with a net coupon between 4.375% and 5.125% can go into pools of 4.5% or 5.0%. Unlike the pooling model discussed above with reference to FIG. 6, there are no pool priorities.

At step 815, the excess coupon module 124 identifies the pool into which a given loan can be allocated based on the collateral attributes of the loan and independent of the pool execution coupon. This gives a one to one mapping between the loans and the pools.

At step 820, the excess coupon module 124 collapses all loans having the same excess coupon within a given pool definition into a single loan. This approach can significantly reduce the number of loans in the loan population.

After the population of loans is reduced, the excess coupon module 124 maximizes the objective function at step 825. The excess coupon module 124 can iteratively determine solutions to the objective function until an optimal solution is found or until a user decides that a solution of sufficient high quality is found.

One of ordinary skill in the art would appreciate that the present invention provides computer-based systems and methods for optimizing fixed rate whole loan trading. Specifically, the invention provides computer-based systems and methods for optimally packaging a population of whole loans into bonds in either a senior/subordinate bond structure or into pools of pass through securities guaranteed by a government agency. Models for each type of bond structure are processed on the population of loans until either an optimal bond package is found or a user determines that a solution of sufficient high quality is found. Additionally, the models can account for bids for whole loans by allocating whole loans that meet requirements of the bid but are least favorable to be securitized.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A system for optimizing fixed rate whole loan trading, comprising:
   a computer comprising a non-transitory storage medium comprising a software application comprising one or more modules operable to:
   a) receive input from a user;
   b) select a population of loans;
   c) determine, by the computer system, at least one module of the one or more modules that optimizes fixed rate whole loan trading based, at least in part, on the received input;
   d) select the at least one module, wherein the at least one module comprises a senior/subordinate module;
   e) determine available bond coupon values from a plurality of bond coupons;
   f) select a first bond coupon value from the available bond coupon values;
   g) determine a price of each loan in the population of loans at the first bond coupon value;
   h) repeat steps f) and g) for a plurality of additional bond coupon values;
   i) determine the bond coupon value from the first bond coupon value and the plurality of additional bond coupon values that yield the a highest final bond price for each loan; and
   j) group the loans in the population of loans according to the bond coupon values that yield the highest final bond price.

2. The system of claim 1, further comprising one or more data sources communicably coupled to the computing system, the one or more data sources comprising information for use by the software application.

3. The system of claim 1, wherein the received input comprises a constraint associated with a securitization strategy of the population of loans.

4. The system of claim 3, wherein the securitization strategy comprises packaging the population of loans into a tranche of senior bonds and a tranche of subordinate bonds.

5. The system of claim 3, wherein the securitization strategy comprises packaging the population of loans into pass through bonds.

6. The system of claim 1, wherein the population of loans selected in step b) comprises loans owned by the user.

7. The system of claim 1, wherein the population of loans selected in step b) comprises loans that are placed for bidding.

8. The system of claim 1, wherein the population of loans selected in step b) comprises loans that match a criterion selected by the user.

9. The system of claim 1, wherein the population of loans are structured into one or more bonds, and wherein each bond is associated with one or more loans of the population of loans.

10. The system of claim 9, further comprises one or more modules operable to:
generate a cash flow of each bond based on a cash flow of the one or more loans associated with the respective bond;
responsive to generating the cash flow of each bond, determine a present value of the cash flow of each bond;
set a price associated with each bond based on the type of bond; and
for each loan, proportionally combine the price associated with each bond based on a size of each bond to determine a final bond price for each loan.

11. The system of claim 10, further comprises one or more modules operable to:
distribute the cash flow associated with each loan of the population of loans into senior bonds having a high credit rating, subordinate bonds having a low credit rating, interest only bonds and principal only bonds; and
generate a principal payment cash flow and an interest cash flow of each loan for a loan period associated with each loan.

12. The system of claim 11:
wherein for fixed rate loans, the senior bonds are priced as a spread to the To Be Announced (TBA) bond prices,
wherein for fixed rate loans, the subordinate bonds are priced as a spread to the United States Treasury Yield Curve, and
wherein for fixed rate loans, the Principal Only bonds and the Interest Only bonds are priced based on Trust Principal Only prices and Trust Interest Only prices.

13. A non-transitory computer readable medium comprising a set of executable instructions that when executed by a processor is configured to optimize fixed rate whole loan trading by performing a method comprising:
a) receiving an input;
b) selecting a population of loans;
c) determining and selecting at least one module from one or more modules that optimizes fixed rate whole loan trading based, at least in part, on the received input, wherein the at least one module comprises a senior/subordinate module;
d) determining available bond coupon values from a plurality of bond coupons;
e) selecting a first bond coupon value from the available bond coupon values;
f) determining a price of each loan in the population of loans at the first bond coupon value;
g) repeating steps e) and f) for a plurality of additional bond coupon values;
h) determining the bond coupon value from the first bond coupon value and the plurality of additional bond coupon values that yield a highest final bond price for each loan; and
i) grouping the loans in the population of loans according to the bond coupon values that yield the highest final bond price.

14. The non-transitory computer readable medium of claim 13, wherein the received input comprises a constraint associated with a securitization strategy for the population of loans.

15. The non-transitory computer readable medium of claim 14, wherein the securitization strategy comprises packaging the population of loans into a tranche of senior bonds and a tranche of subordinate bonds.

16. The non-transitory computer readable medium of claim 13, wherein the population of loans selected in step b) comprises loans that are placed for bidding.

17. The non-transitory computer readable medium of claim 13, wherein the population of loans selected in step b) comprises loans that match a criterion selected from a plurality of criteria.

18. The non-transitory computer readable medium of claim 13, wherein the population of loans are structured into one or more bonds, and wherein each bond is associated with one or more loans of the population of loans.

19. The non-transitory computer readable medium of claim 18, wherein the method performed by the set of executable instructions when executed by a processor further comprising:
generating a cash flow of each bond based on a cash flow of the one or more loans associated with the respective bond;
responsive to generating the cash flow of each bond, determining a present value of the cash flow of each bond;
setting a price associated with each bond based on the type of bond; and
for each loan, proportionally combining the price associated with each bond based on a size of each bond to determine a final bond price for each loan.

20. The non-transitory computer readable medium of claim 18, wherein the method performed by the set of executable instructions when executed by a processor further comprising:
distribute the cash flow associated with each loan of the population of loans into senior bonds having a high credit rating, subordinate bonds having a low credit rating, interest only bonds and principal only bonds; and
generate a principal payment cash flow and an interest cash flow of each loan for a loan period associated with each loan, wherein for fixed rate loans, the senior bonds are priced as a spread to the To Be Announced (TBA) bond prices, wherein for fixed rate loans, the subordinate bonds are priced as a spread to the United States Treasury Yield Curve, and
wherein for fixed rate loans, the Principal Only bonds and the Interest Only bonds are priced based on Trust Principal Only prices and Trust Interest Only prices.

* * * * *